(12) United States Patent
Beaumont

(10) Patent No.: US 7,437,726 B2
(45) Date of Patent: *Oct. 14, 2008

(54) METHOD FOR ROUNDING VALUES FOR A PLURALITY OF PARALLEL PROCESSING ELEMENTS

(75) Inventor: Mark Beaumont, Reading (GB)

(73) Assignee: Micron Technology, Inc., Boise, ID (US)

(*) Notice: Subject to any disclaimer, the term of this patent is extended or adjusted under 35 U.S.C. 154(b) by 887 days.

This patent is subject to a terminal disclaimer.

(21) Appl. No.: 10/689,382

(22) Filed: Oct. 20, 2003

(65) Prior Publication Data

US 2004/0215925 A1 Oct. 28, 2004

(30) Foreign Application Priority Data

Apr. 23, 2003 (GB) ................................. 0309200.4

(51) Int. Cl.
*G06F 9/46* (2006.01)
(52) U.S. Cl. .................... 718/100; 718/101; 718/105
(58) Field of Classification Search ............. 708/497; 718/100–101, 105
See application file for complete search history.

(56) References Cited

U.S. PATENT DOCUMENTS

| | | | | |
|---|---|---|---|---|
| 4,386,413 A | * | 5/1983 | Vignes et al. ............... | 708/497 |
| 4,633,387 A | | 12/1986 | Hartung et al. | |
| 4,992,933 A | | 2/1991 | Taylor | |
| 5,109,512 A | | 4/1992 | Bahr et al. | |
| 5,241,677 A | | 8/1993 | Naganuma et al. | |
| 5,535,387 A | | 7/1996 | Matsuoka et al. | |
| 5,581,773 A | | 12/1996 | Glover | |
| 5,630,129 A | | 5/1997 | Wheat | |
| 5,701,482 A | | 12/1997 | Harrison et al. | |
| 5,850,489 A | | 12/1998 | Rich | |

(Continued)

FOREIGN PATENT DOCUMENTS

WO WO 01/88696 A3 11/2001

OTHER PUBLICATIONS

Daehyun Kim, Mainak Chaudhuri, and Mark Heinrich, Leveraging Cache Coherence in Active Memory Systems, Proceedings of the 16th ACM Int'l Conference on Supercomputing, pp. 2-13, New York City, USA, Jun. 2002.

(Continued)

*Primary Examiner*—Meng-Ai An
*Assistant Examiner*—Eric C Wai
(74) *Attorney, Agent, or Firm*—Jones Day; Edward L. Pencoske

(57) ABSTRACT

A method for calculating a local mean number of tasks for each processing element ($PE_r$) in a parallel processing system, wherein each processing element ($PE_r$) has a local number of tasks associated therewith and wherein r represents the number for a selected processing element, the method comprising assigning a value ($E_r$) to the each processing element ($PE_r$), summing a total number of tasks present on the parallel processing system and the value ($E_r$) for the each processing element ($PE_r$), dividing the sum of the total number of tasks present on the parallel processing system and the value ($E_r$) for the each processing element ($PE_r$) by a total number of processing elements in the parallel processing system and truncating a fractional portion of the divided sum for the each processing element.

11 Claims, 4 Drawing Sheets

U.S. PATENT DOCUMENTS

| | | |
|---|---|---|
| 5,892,517 A | 4/1999 | Rich |
| 5,966,528 A | 10/1999 | Wilkinson et al. |
| 6,078,945 A | 6/2000 | Hinsley |
| 6,219,776 B1 | 4/2001 | Pechanek et al. |
| 6,279,088 B1 | 8/2001 | Elliott et al. |
| 6,292,822 B1 | 9/2001 | Hardwick |
| 6,392,822 B1 | 5/2002 | Takahashi |
| 6,404,439 B1 | 6/2002 | Coulombe et al. |
| 6,421,772 B1 | 7/2002 | Maeda et al. |
| 6,430,618 B1 | 8/2002 | Karger et al. |
| 6,587,938 B1 | 7/2003 | Eilert et al. |
| 6,651,082 B1 | 11/2003 | Kawase et al. |
| 2004/0024874 A1 | 2/2004 | Smith |

OTHER PUBLICATIONS

Mainak Chaudhuri, Daehyun Kim, and Mark Heinrich, Cache Coherence Protocol Design for Active Memory Systems, Proceedings of the 2002 Int'l Conference on Parallel and Distributed Processing Techniques and Applications, pp. 83-89, Las Vegas, USA, Jun. 2002.

Rudolf, Larry; Silvkin-Allalouf, Miriam; Upfal, Eli; A Simple Load Balancing Scheme for Task Allocation in Parallel Machines; 1991 ACM.

Finnet, Thomas; Calculus; Second Edition 1994, p. 568.

\* cited by examiner

METHOD FOR ROUNDING VALUES FOR A PLURALITY OF PARALLEL PROCESSING ELEMENTS

CROSS-REFERENCE TO RELATED APPLICATIONS

The present application is related to U.S. patent application Ser. No. 10/689,345 entitled "Method for Load Balancing a Line of Parallel Processing Elements" filed 20 Oct. 2003, U.S. patent application Ser. No. 10/689,312 entitled "Method for Using Extrema to Load Balance a Loop of Parallel Processing Elements" filed 20 Oct. 2003, U.S. patent application Ser. No. 10/689,336 entitled "Method for Load Balancing a Loop of Parallel Processing Elements" filed 20 Oct. 2003, U.S. patent application Ser. No. 10/689,355 entitled "Method for Using Filtering to Load Balance a Loop of Parallel Processing Elements" filed 20 Oct. 2003, U.S. patent application Ser. No. 10/689,365 entitled "Method for Load Balancing an N-Dimensional Array of Parallel Processing Elements" filed 20 Oct. 2003, and U.S. patent application Ser. No. 10/689,280 entitled "Method of Obtaining Interleave Interval for Two Data Values" filed 20 Oct. 2003.

BACKGROUND OF THE INVENTION

The present invention relates generally to parallel processing and more particularly to algorithms employed to balance the work loads of the processing elements within a parallel processing system.

Conventional central processing units ("CPU's"), such as those found in most personal computers, execute a single program (or instruction stream) and operate on a single stream of data. For example, the CPU fetches its program and data from a random access memory ("RAM"), manipulates the data in accordance with the program instructions, and writes the results back sequentially. There is a single stream of instructions and a single stream of data (note: a single operation may operate on more than one data item, as in X=Y +Z, however, only a single stream of results is produced). Although the CPU may determine the sequence of instructions executed in the program itself, only one operation can be completed at a time. Because conventional CPUs execute a single program (or instruction stream) and operate on a single stream of data, conventional CPUs may be referred to as a single-instruction, single data CPU or an SISD CPU.

The speed of conventional CPUs has dramatically increased in recent years. Additionally, the use of cache memories enables conventional CPUs faster access to the desired instruction and data streams. However because conventional CPUs can complete only one operation at a time, conventional CPUs are not suitable for extremely demanding applications having large data sets (such as moving image processing, high quality speech recognition, and analytical modeling applications, among others).

Improved performance over conventional SISD CPUs may be achieved by building systems which exhibit parallel processing capability. Typically, parallel processing systems use multiple processing units or processing elements to simultaneously perform one or more tasks on one or more data streams. For example in one class of parallel processing system, the results of an operation from a first CPU are passed to a second CPU for additional processing, and from the second CPU to another CPU, and so on. Such a system, commonly known as a "pipeline", is referred to as a multiple-instruction, single-data or MISD system because each CPU receives a different instruction stream while operating on a single data stream. Improved performance may also be obtained by using a system which contains many autonomous processors, each running its own program (even if the program running on the processors is the same code) and producing multiple data streams. Systems in this class are referred to as a multiple-instruction, multiple-data or MIMD system.

Additionally, improved performance may be obtained using a system which has multiple identical processing units each performing the same operations at once on different data streams. The processing units may be under the control of a single sequencer running a single program. Systems in this class are referred to as a single-instruction, multiple data or SIMD system. When the number of processing units in this type of system is very large (e.g., hundreds or thousands), the system may be referred to as a massively parallel SIMD system.

Nearly all computer systems now exhibit some aspect of one or more of these types of parallelism. For example, MMX extensions are SIMD; multiple processors (graphics processors, etc) are MIMD; pipelining (especially in graphics accelerators) is MISD. Furthermore, techniques such as out of order execution and multiple execution units have been used to introduce parallelism within conventional CPUs as well.

Parallel processing is also used in active memory applications. An active memory refers to a memory device having a processing resource distributed throughout the memory structure. The processing resource is most often partitioned into many similar processing elements (PEs) and is typically a highly parallel computer system. By distributing the processing resource throughout the memory system, an active memory is able to exploit the very high data bandwidths available inside a memory system. Another advantage of active memory is that data can be processed "on-chip" without the need to transmit the data across a system bus to the CPU or other system resource. Thus, the work load of the CPU may be reduced to operating system tasks, such as scheduling processes and allocating system resources.

A typical active memory includes a number of interconnected PEs which are capable of simultaneously executing instructions sent from a central sequencer or control unit. The PEs may be connected in a variety of different arrangements depending on the design requirements for the active memory. For example, PEs may be arranged in hypercubes, butterfly networks, one-dimensional strings/loops, and two-dimensional meshes, among others.

In typical active memories, load imbalances often occur such that some PEs are idle (i.e., without assigned tasks) while other PEs have multiple tasks assigned. To maximize the effectiveness of the active memory, it is desirable to balance the work load across all of the PEs. For example in an active memory having a multitude of identical PEs, it is desirable that each PE be assigned the same number of instructions by the central sequencer, thus maximizing the resources of the active memory. Additionally in an active memory having non-identical PEs, it may be desirable to assign more tasks to the PEs with greater processing capabilities. By balancing the load, the amount of time that one or more PEs is idle while waiting for one or more other PEs to complete their assigned tasks is minimized.

In some instances, the mean value of instructions encountered by all PEs within an array may be used by a balancing method for redistributing tasks within the array. However, rounding errors caused by prior art algorithms and methods for finding the mean value of tasks often cause tasks to be "lost" or "gained".

Thus, there exists a need for a method for balancing the load of a parallel processing system such that the resources of the parallel processing system are maximized. For example, there exists a need for a method for balancing the load of an active memory such that the resources of the active memory are maximized. More specifically, there exits a need for a method for determining the mean value of tasks assigned to PEs such that rounding errors are eliminated and tasks are not lost or gained.

SUMMARY OF THE INVENTION

One aspect of the present invention relates to a method for calculating a local mean number of tasks for each processing element ($PE_r$) in a parallel processing system, wherein each processing element ($PE_r$) has a local number of tasks associated therewith and wherein r represents the number for a selected processing element. The method comprising assigning a value ($E_r$) to the each processing element ($PE_r$), summing a total number of tasks present on the parallel processing system, further augmenting said sum by adding the value ($E_r$) on each processing element ($PE_r$), dividing the augmented sum for the each processing element ($PE_r$) by a total number of processing elements in the parallel processing system and truncating a fractional portion of the divided sum for each processing element.

The present invention enables local mean calculations to be completed without introducing rounding errors which may, for example, have adverse effects on subsequent load balancing methods related to an array of processing elements. The present invention enables tasks to be distributed within a network of connected PEs so that each PE typically has X number of tasks or (X+1) number of tasks to perform in the next phase. The present invention may be performed using the hardware and software (i.e., the local processing capability) of each PE within the array. Those advantages and benefits, and others, will become apparent from description of the invention below.

BRIEF DESCRIPTION OF THE DRAWINGS

To enable the present invention to be easily understood and readily practiced, the present invention will now be described for purposes of illustration and not limitation, in connection with the following figures wherein.

DETAILED DESCRIPTION OF THE INVENTION

As discussed above, parallel processing systems may be placed within one or more classifications (e.g., MISD, MIMD, SIMD, etc.). For simplicity, the present invention is discussed in the context of a SIMD parallel processing system. More specifically, the present invention is discussed in the context of a SIMD active memory. It should be noted that such discussion is for clarity only and is not intended to the limit the scope of the present invention in any way. The present invention may be used for other types and classifications of parallel processing systems.

Figure 1:
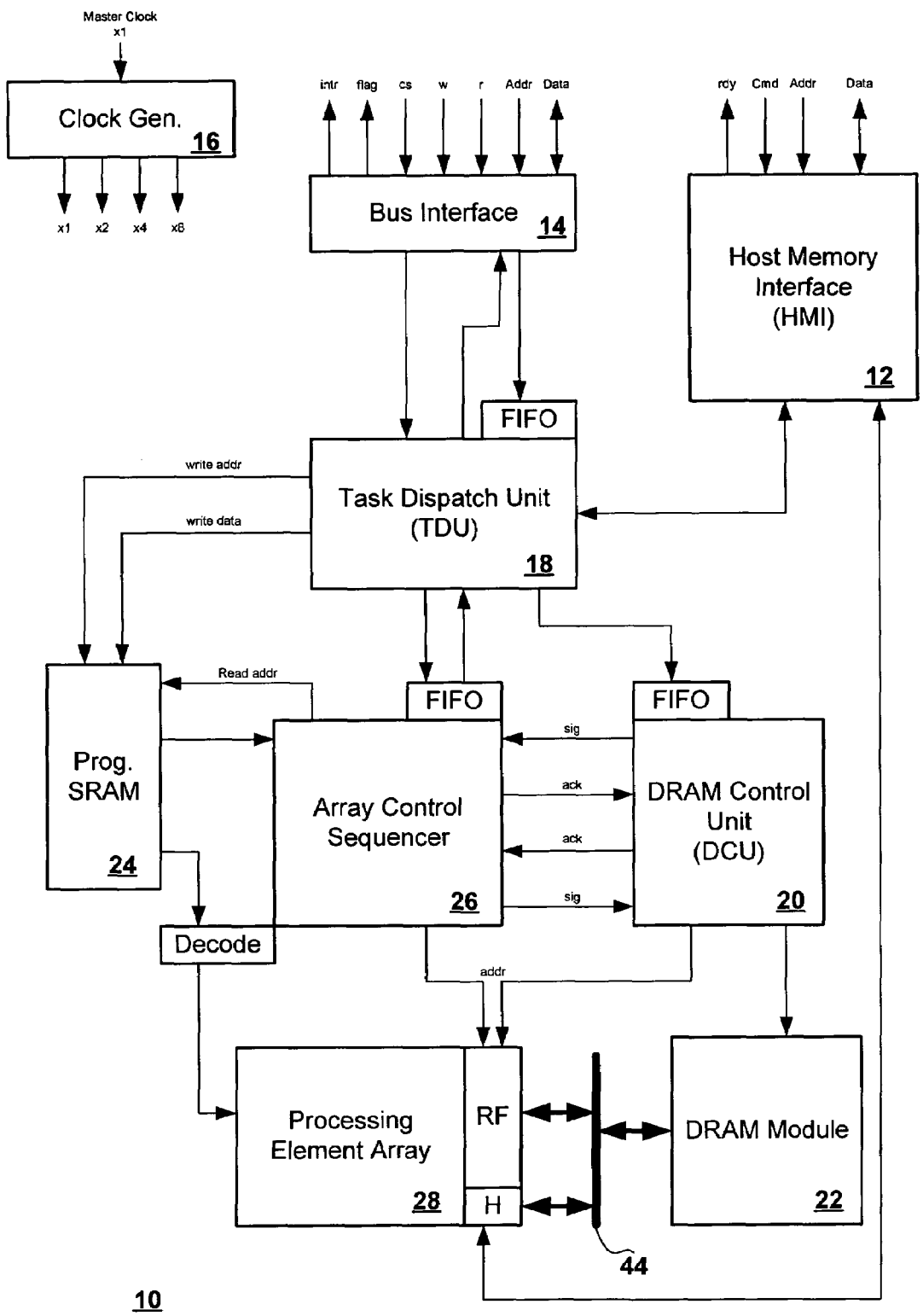
FIG. 1 is a block diagram illustrating an active memory according to an embodiment of the present invention.

FIG. 1 is a block diagram illustrating an active memory 10 according to an embodiment of the present invention. It should be noted that the active memory 10 is only one example of a device on which the methods of the present invention may be practiced and those of ordinary skill in the art will recognize that the block diagram of FIG. 1 is an overview of an active memory device 10 with a number of components known in the art being omitted for purposes of clarity.

Active memory 10 is intended to be one component in a computer system. Processing within active memory 10 is initiated when the active memory 10 receives commands from a host processor (not shown), such as the computer system's CPU. A complete processing operation (i.e., data movement and processing) in the active memory 10 may consist of a sequence of many commands from the host to the active memory device 10.

Active memory 10 is comprised of a host memory interface ("HMI") 12, a bus interface 14, a clock generator 16, a task dispatch unit ("TDU") 18, a DRAM control unit ("DCU") 20, a DRAM module 22, a programmable SRAM 24, an array control sequencer 26, and a processing element array 28, among others.

The HMI 12 provides an input/output channel between the host (such as a CPU, not shown) and the DRAM module 22. In the current embodiment, the HMI 12 receives command (cmd), address (addr), and data signals (among others) from and sends data and ready (rdy) signals (among others) to the host. The HMI 12 approximates the operation of a standard non-active memory so that the host, without modifications, is compatible with the active memory 10.

The HMI 12 may be similar in its operation to the interface of a synchronous DRAM as is know in the art. Accordingly, the host must first activate a page of data to access data within a DRAM module 22. In the current embodiment, each page may contain 1024 bytes of data and there may be 16,384 pages in all. Once a page has been activated, it can be written and read through the HMI 12. The data in the DRAM module 22 may be updated when the page is deactivated. The HMI 12 also sends control signals (among others) to the DCU 20 and to the processing element array 28 via the task dispatch unit 18.

The HMI 12 may operate at a frequency different than that of the frequency of the master clock. For example, a 2× internal clock signal from clock generator 16 may be used. Unlike a traditional DRAM, the access time for the HMI 12 uses a variable number of cycles to complete an internal operation, such as an activate or deactivate. Thus, the ready signal (rdy) is provided to allow the host to detect when a specific command has been completed.

The bus interface 14 provides and input/output channel between the host and the TDU 18. For example, the bus interface 14 receives column select (cs), write command (w), read command (r), address (addr), and data signals (among others) from and places interrupt (intr), flag, and data signals (among others) onto the system bus (not shown). The bus interface 14 also receives signals from and sends signals to TDU 18.

The clock generator 16 is operable to receive an external master clock signal (x1) and operable to provide the master clock signal (x1) and one or more internal clock signals (x2, x4, x8) to the components of the active memory. It should be apparent to one skilled in the art that other internal clock signals may be produced by the clock generator 16.

The TDU 18 communicates with the bus interface 14, the HMI 12, the programmable SRAM 24, the array control sequencer 26, and the DCU 20. In the current embodiment, the TDU 18 functions as an interface to allow the host to issue a sequence of commands to the array control sequencer 26 and the DCU 20. Task commands from the host may be buffered in the TDU's FIFO buffers to allow a burst command to be issued. Commands may contain information on how the tasks in the array control sequencer 26 and the DCU 20 should be synchronized with one another, among others.

The DCU 20 arbitrates between the TDU 18 and the HMI 12 and sends commands to the DRAM modules 22 and the processing element array 28. The DCU 20 also schedules refreshes within the DRAM modules 22. In one embodiment, the DRAM modules 22 of the active memory 10 may be comprised of sixteen 64 k×128 eDRAM (or embedded DRAM) cores. Each eDRAM core may be connected to an array of sixteen PEs, thus requiring 256 (16×16) PEs in all.

The programmable SRAM 24 functions as a program memory by storing commands issued by the TDU 18. For example, the TDU 18 may transmit a "write program memory address" command which sets up a start address for a write operation and a "write program memory data" command which writes a memory location and increments the program memory write address, among others. The programmable SRAM 24, in the current embodiment, has both an address register and a data output register.

The array control sequencer 26 is comprised of a simple 16 bit minimal instruction set computer (16-MISC). The array control sequencer 26 communicates with the TDU 18, the programmable SRAM 24, and the DCU 20, and is operable to generate register file addresses for the processing element array 28 and operable to sequence the array commands, among others.

The processing element array 28 is comprised of a multitude of processing elements ("PEs") 30 (see FIG. 2) connected in a variety of different arrangements depending on the design requirements for the processing system. For example, processing units may be arranged in hypercubes, butterfly networks, one-dimensional strings/loops, and two-dimensional meshes, among others. In the current embodiment, the processing elements 30 are arranged in a line (for example, see FIG. 3). The processing element array 28 communicates with the DRAM module 22 and executes commands received from the programmable SRAM 24, the array control sequencer 26, the DCU 20, and the HMI 12. Each PE in the processing element array 28 includes dedicated H-registers for communication with the HMI 12. Control of the H-registers is shared by the HMI 12 and the DCU 20.

Figure 2:
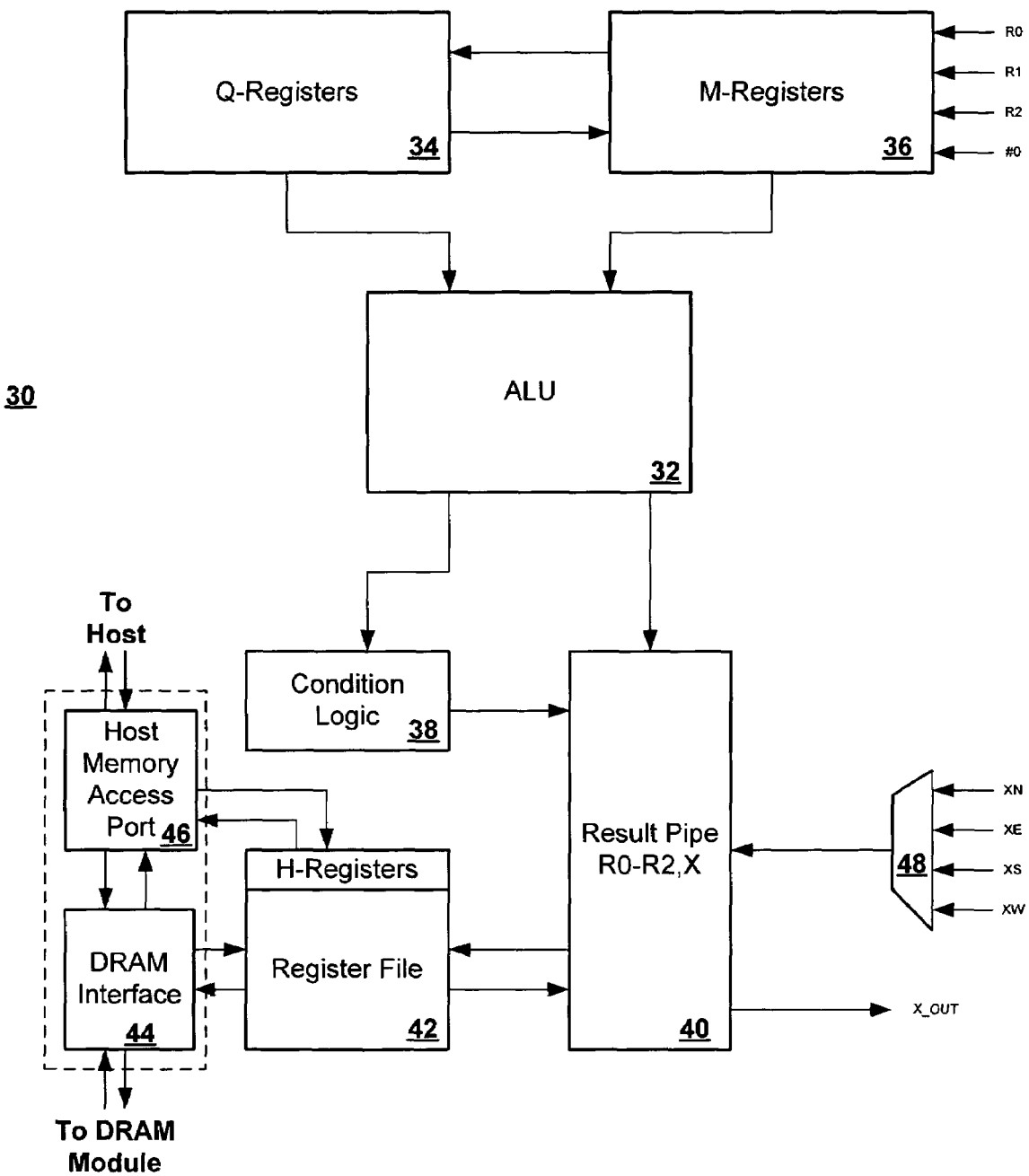
FIG. 2 is a block diagram of a processing element for the active memory illustrated in FIG. 1 according to an embodiment of the present invention.

Referring now to FIG. 2, a block diagram of a PE 30 according to one embodiment of the present invention is illustrated. PE 30 includes an arithmetic logic unit ("ALU") 32, Q-registers 34, M-registers 36, a shift control and condition register 38 (also called "condition logic" 38), a result register pipeline 40, and register file 42. The PE 30 may also contain other components such as multiplexers 48 and logic gates (not shown), among others.

In the current embodiment, the Q-registers 34 are operable to merge data into a floating point format and the M-Registers 36 are operable to de-merge data from a floating point format into a single magnitude plus an exponent format. The ALU 32 is a multiplier-adder operable (among others) to receive information from the Q-registers 34 and M-registers 36, execute tasks assigned by the TDU 18 (see FIG. 1), and transmit results to the shift control and condition register 38 and to the result register pipeline 40. The result register pipeline 40 is operable to communicate with the register file 42, which holds data for transfer into or out of the DRAM modules 22 via a DRAM interface 44. Data is transferred between the PE and the DRAM module 22 via a pair a registers, one register being responsive to the DCU 20 and the other register being responsive to the PE 30. The DRAM interface receives command information from the DCU 20. The DRAM interface 44 also permits the PE 30 to communicate with the host through the host memory access port 46.

In the current embodiment, the H-registers 42 are comprised of synchronous SRAM and each processing element within the processing element array 28 contains eight H-registers 42 so that two pages can be stored from different DRAM locations, thus allowing the interleaving of short i/o bursts to be more efficient. Result register pipeline 40 is also connected to one or more neighborhood connection registers ("X-register") (not shown). The X-register links one PE 30 to its neighboring PE's 30 in the processing element array 28.

The reader desiring more information about the hardware shown in FIGS. 1 and 2 is directed to UK Patent application No. 0221563.0 entitled "Control of Processing Elements in Parallel Processors" filed 17 Sep. 2002, which is hereby incorporated by reference. Details about the PEs may also be found in UK Patent Application No. 021562.2 entitled "Host Memory Interface for a Parallel Processor" filed 17 Sep. 2002, which is hereby incorporated by reference.

Figure 3:
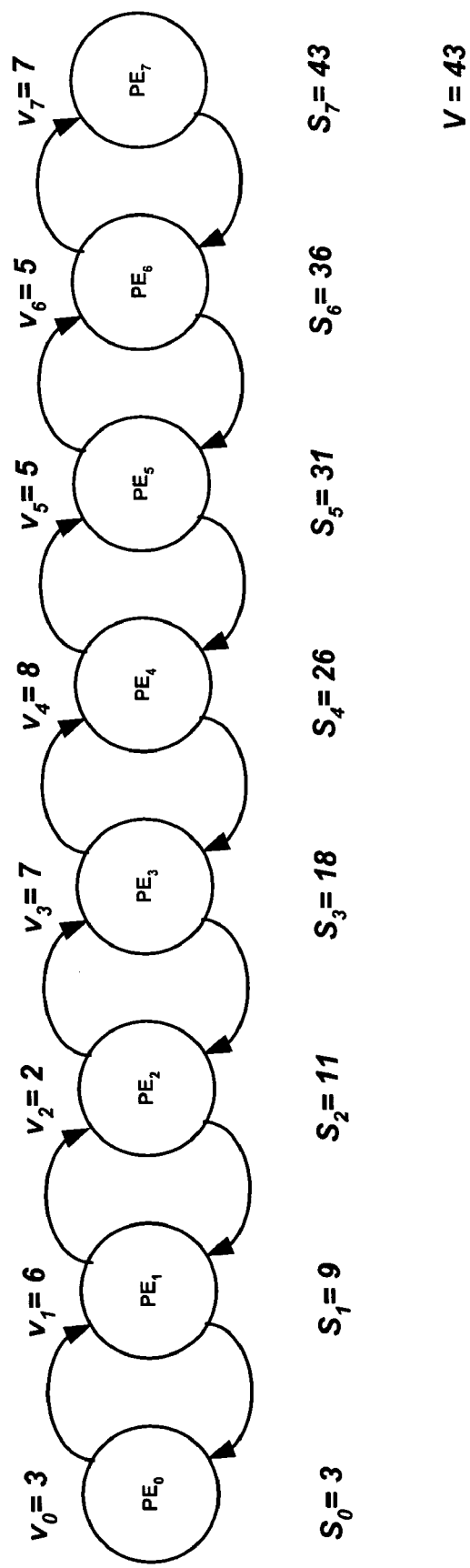
FIG. 3 illustrates an array of the processing elements illustrated in FIG. 2 arranged in a line according to an embodiment of the present invention.

FIG. 3 is a simplified diagram showing the interconnections of an array of PEs 30 (as illustrated in FIG. 2) arranged in a line 50 according to an embodiment of the present invention. In the current embodiment, line 50 is comprised of eight (8) PEs (i.e., $PE_r$, where r=0, 1, 2 . . . 7) which are interconnected via their associated X-register links. It should be noted that the number of PEs 30 included in line 50 may be altered while remaining within the scope of the present invention. It should further be noted that although the current embodiment is discussed with respect to a single line of PEs, the present invention is applicable to other arrangements as well. For example, the present invention may be employed for PEs arranged in N×N n-dimensional arrays, one-dimensional loop arrays, hypercubes, butterfly networks, two-dimensional meshes, etc. while remaining with the scope of the present invention. In the current embodiment, each PE 30 in line 50 is operable to receive instructions from TDU 18 as discussed in conjunction with FIG. 1.

As illustrated in FIG. 3, each $PE_r$ has a local number of tasks ($v_r$) associated therewith. For example, $PE_0$, $PE_1$, $PE_2$, . . . $PE_7$ have local number of tasks $v_0=3$, $v_1=6$, $v_2=2$ . . . $v_7=7$, respectively, associated therewith. $PE_1$ through $PE_6$ are operable to communicate with both their left and right neighboring PEs. For example, $PE_1$ can communicate with $PE_0$ (i.e., $PE_1$'s left neighbor) and with $PE_2$ (i.e., $PE_1$'s right neighbor). In the current embodiment, the line's 50 left end PE (i.e., $PE_0$) is operable to communicate with its right neighbor (i.e., $PE_1$), whereas the line's 50 right end PE (i.e., $PE_7$) is operable to communicate with its left neighbor (i.e., $PE_6$). It should be noted, however, that each PE on the end of line 50 (i.e., $PE_0$ and $PE_7$) may also be operable to communicate with a PE from another line (e.g., to link two or more lines in an array) or to communicate with each other (e.g., $PE_0$ and $PE_7$ may communicate to permit a wrap function).

It should be noted that "line" refers to at least two serially connected PEs. It should be apparent to one skilled in the art that "line" is intended to include PE's arranged in a linear array (e.g., rows, columns, diagonals, etc.) and other non-linear shapes. It should also be apparent to one skilled in the art that serially connected arrays having uniform and/or varied distances between one or more of the PEs are within the scope of the present invention.

In the current embodiment, the total number of tasks (V) on the line 50 may be found by summing the local number of tasks ($v_r$) associated we each $PE_r$ in the line 50. In the current embodiment, a partial sum ($S_r$) of the number of tasks ($v_r$) is passed from a first end to a second end of the line 50 (e.g., from the leftmost PE to the rightmost PE). The partial sum ($S_r$) is initialized to the number of tasks on the first end (here $S_0=v_0$). The partial sum ($S_r$) is then passed serially from $PE_r$ to $PE_{r+1}$ (i.e., from left to right). Each $PE_r$ receives the partial sum and adds it's own number of tasks to the partial sum (i.e., $S_r=S_{r+1}+v_r$). After adding it's number of tasks ($v_r$), $PE_r$ passes the partial sum ($S_r$) to $PE_{r+1}$. When the partial sum ($S_r$) reaches the right end (i.e., $PE_{N-1}$), the last tasks ($V_{N-1}$) are added to form the total sum of tasks (V). The sum (V) can be expressed by the equation $$V = \sum_{i=0}^{i=N-1} v_i,$$

where N represents the number of PEs 30 in the line 50, and $v_i$ represents the local number of tasks associated with a local $PE_r$ in the line 50. It should also be noted that in the current discussion, "local" refers to the values or functions associated with a single PE within the line, whereas "global" refers to the values or functions associated with the entire line of PEs. It should be noted that other methods of finding the total number of task may be used while remaining within the scope of the present invention.

Referring to FIG. 3, $PE_0$ has 3 tasks associated therewith (i.e., $v_0=3$). Thus, the initial value for the partial sum is also 3 (i.e., $S_0=v_0=3$). The partial sum is then passed to $PE_1$, which has 6 tasks associated therewith (i.e., $v_1=6$). The number of tasks associated with $PE_1$ is then added to the partial sum $S_0$ to obtain $S_1=9$ (i.e., $S_1=S_0+v_1$). The partial sum continues to be passed serially until it reaches the right end of line 50 (i.e., $PE_7$). As illustrated in FIG. 3, the total sum of tasks on line 50 is equal to forty-three (i.e., V=43).

It may be desirable for some applications to find a local mean value of tasks ($M_r$) for each $PE_r$ on the line 50. For example, the local mean value ($M_r$) may be used in methods for balancing the load among the PEs on the line 50. Using the total sum of tasks (V), a local mean value for each PE on the line 50 can be determined. Using a simple mean function (i.e., without the use of a rounding algorithm), the mean value for each $PE_r$ (i.e., $PE_0 \ldots PE_7$) in the current embodiment may be calculated as $$M_r = \frac{V}{N},$$

where $M_r$ represents the local mean value of tasks for $PE_r$, V represents the total number of tasks on the line 50, and N represents the number of PEs 30 in the line 50.

This simple mean function, however, produces rounding errors that may impact later load balancing processes. For example in the current embodiment, forty-three (43) tasks (i.e., V=43) are to be shared by the eight PEs in line 50 (i.e., $PE_0$ through $PE_7$). The local mean for each PE, using the simple mean function, would be $PE_r=5.375$ (i.e., 43÷8=5.375). If the result (i.e., 5.375) is designated to round down for each PE (i.e., 43÷8 is set equal to 5), then the sum of the means for all of the individual PEs (i.e., $PE_0$ through $PE_7$) will be equal to 40. Thus, three (43−40=3) tasks are lost. In contrast, if the result (i.e., 5.375) is designated to round up for each PE (i.e., 43÷8 is set equal to 6), then the sum of the means for all of the individual PEs (i.e., $PE_0$ through $PE_7$) will be equal to 48. Thus, five (48−43=5) tasks are gained. Accordingly, the simple mean function introduces errors into any subsequent load balancing process.

A rounding function that satisfies the equation $$V = \sum_{i=0}^{i=N-1} M_i$$

(where N represents the number of PEs 30 in the line 50, and $M_i$ represents the local mean of tasks associated with a local $PE_r$ in the line 50) is desirable to prevent rounding errors. In other words, it is desirable that the sum of the local means ($M_r$) for all PEs on the line 50 equals the total number of tasks (V) on the line such that tasks are neither "lost" nor "gained" during a mean calculation step.

Figure 4:
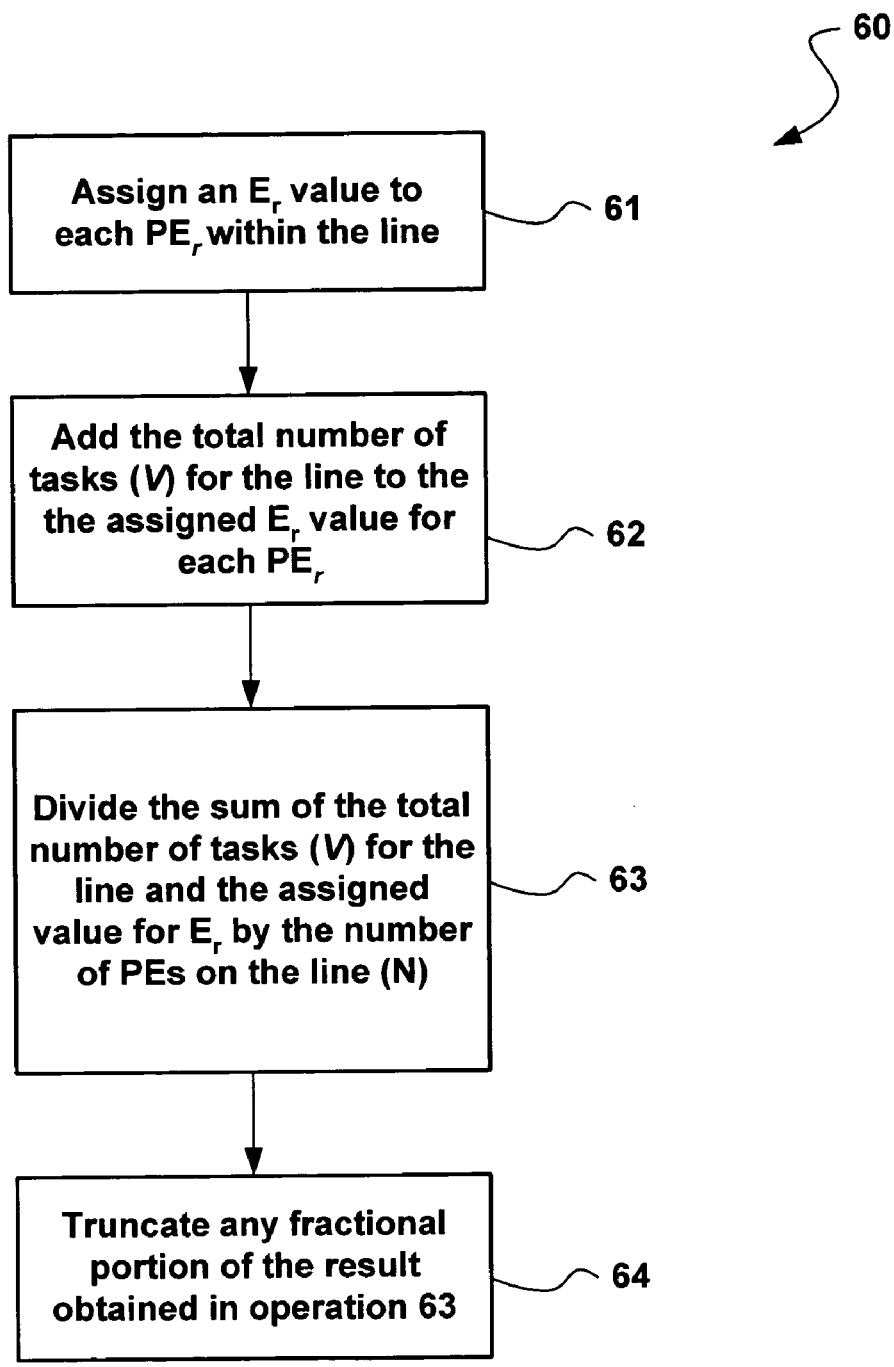
FIG. 4 illustrates an operational process for an improved rounding function for rounding the local mean value of one or more processing elements within an array according to an embodiment of the present invention.

FIG. 4 illustrates an operational process 60 for an improved rounding function for rounding the local mean value of one or more processing elements within an array according to an embodiment of the present invention. Operational process 60 begins with $E_r$ values being assigned to the PEs in the line in operation 61, where $E_r$ represents a number in the range of 0 to (N−1). In the current embodiment, each $PE_r$ is assigned a different $E_r$ value for controlling the rounding. The simplest form for the function E is the case in which $E_r=P_r$, the number of the PE. For example, for $PE_0$, $E_0=0$; for $PE_1$, $E_1=1$; for $PE_2$, $E_2=2$; etc Table #1 below.) By assigning each PE 30 a different $E_r$ value, the rounding function can be controlled such that some of the local means are rounded up and some of the local means are rounded down, thus insuring that $$V = \sum_{i=0}^{i=N-1} M_i.$$

After the $E_r$ values are assigned in operation 61, the total number of tasks (V) present on the line 50 is added to the $E_r$ value for each $PE_r$. For example, in the case in which forty-three (43) tasks are present on the line, forty-three (43) is added to $E_0$ (i.e., 43+0=43), $E_1$ (i.e., 43+1=44), $E_2$ (i.e., 43+2=45), and $E_7$ (i.e., 43+7=50). (See Table #1 below.)

After the total number of tasks is added to each $E_r$ value in operation 62, the sum of the total number of tasks (V) and the $E_r$ value is divided by the number of PEs on the line (N) in operation 63. As mentioned above, the line 50 is comprised of eight (8) PEs. Thus, each sum found in operation 62 is divided by eight (8). (See Table #1 below.)

After the sums of the total number of tasks and the $E_r$ value is divided the number of PEs on the line (N) in operation 63, the results for each $PE_r$ are truncated in operation 64. More specifically, any fractional part of the result is truncated (i.e., removed) such that only an integer remains. The results obtained for each $PE_r$ in the current embodiment are illustrated in Table 1. For example prior to operation 64, $PE_2$ had a value of five-and-five-eighths (i.e., 5.625), whereas after truncation in operation 64 $PE_2$ has a value of five (5).

Referring to Table #1, it is apparent that the sum of column "Trunc(V+$E_r$)/N)" is equal to forty-three (43). Thus, the equation $$V = \sum_{i=0}^{i=N-1} M_i$$

is satisfied and no tasks have been gained or lost. After the results are truncated in operation 64, operational process 60 is terminated. It should be noted that in the current embodiment, operational process 60 is completed in parallel for each $PE_r$ on line 50.

TABLE #1

Local Mean Calculation for V = 43, N = 8.

| $PE_r$ | $E_r$ | $(V + E_r)/N$ | $Trunc((V + E_r)/N)$ |
|---|---|---|---|
| $PE_0$ | 0 | 5.375 | 5 |
| $PE_1$ | 1 | 5.5 | 5 |
| $PE_2$ | 2 | 5.625 | 5 |
| $PE_3$ | 3 | 5.75 | 5 |
| $PE_4$ | 4 | 5.875 | 5 |
| $PE_5$ | 5 | 6 | 6 |
| $PE_6$ | 6 | 6.125 | 6 |
| $PE_7$ | 7 | 6.25 | 6 |

Table #1 illustrates the local mean calculation for the current embodiment in which the total number of tasks on the line 50 (which is comprised of eight PEs) is equal to forty-three (43). Referring to Table 1, it is apparent that the rounding function controls the rounding such that $M_0$ through $M_4$ are rounded to five (5), whereas $M_5$ through $M_7$ are rounded to six (6). The sum of the values of $M_0$ through $M_7$ is equal to 43, which is equal to the total number of tasks (V) on the line 50. Thus, tasks were neither lost nor gained due to rounding.

Referring to Table #1, it should be apparent that a $PE_r$ having an $E_r$ function set to a lower value (e.g., 0, 1, 2, . . . ) tends to have a local mean of X, whereas a $PE_r$ having an $E_r$ function set to a higher value (e.g., (N−1), (N−2), (N−3), . . . ) tends to have a local mean of (X+1). Accordingly, it should be noted that the form for the function E may be altered from the case in which $E_r=P_r$, to obtain other results. For example, the values assigned may be reversed to obtain the results shown in Table #2 or the values interleaved to obtain the results shown in Table #3. It should be apparent that other forms of the function E may be used while remaining within the scope of the present invention.

TABLE #2

Local Mean Calculation for V = 43, N = 8, Reverse Function for $E_r$.

| $PE_r$ | 0 | 1 | 2 | 3 | 4 | 5 | 6 | 7 |
|---|---|---|---|---|---|---|---|---|
| $E_r$ | 7 | 6 | 5 | 4 | 3 | 2 | 1 | 0 |
| $M_r$ | 6 | 6 | 6 | 5 | 5 | 5 | 5 | 5 |

TABLE #2

Local Mean Calculation for V = 43, N = 8, Interleave Function for $E_r$.

| $PE_r$ | 0 | 1 | 2 | 3 | 4 | 5 | 6 | 7 |
|---|---|---|---|---|---|---|---|---|
| $E_r$ | 0 | 4 | 2 | 6 | 1 | 5 | 3 | 7 |
| $M_r$ | 5 | 5 | 5 | 6 | 5 | 6 | 5 | 6 |

It should be recognized that the above-described embodiments of the invention are to be illustrative only. Numerous alternative embodiments may be devised by those n the art without departing from the scope of the following claims.

What is claimed is:

1. A method for calculating a local mean number of tasks for each processing element ($PE_r$) in a parallel processing system, wherein each processing element ($PE_r$) has a local number of tasks associated therewith and wherein r represents the number for a selected processing element, said method being performed on at least a portion of the parallel processing elements within the processing system, said method comprising:

assigning a value ($E_r$) to said each processing element ($PE_r$);

summing a total number of tasks present on said parallel processing system and said value ($E_r$) for said each processing element ($PE_r$);

dividing the sum of said total number of tasks present on said parallel processing system and said value ($E_r$) for said each processing element ($PE_r$) by a total number of processing elements in said parallel processing system; and truncating any fractional portion resulting from said dividing for said each processing element to produce said local mean.

2. The method of claim 1 wherein said assigning a value ($E_r$) to said each processing element ($PE_r$) comprises setting said value ($E_r$) equal to a number between 0 and (N−1), where N represents said total number of processing elements in said parallel processing system.

3. The method of claim 2 wherein said assigning a value ($E_r$) to said each processing element ($PE_r$) further comprises giving a unique number to said each value ($E_r$) for said each processing element $PE_r$.

4. The method of claim 1 wherein said assigning a value ($E_r$) to said each processing element ($PE_r$) comprises setting said value ($E_r$) equal to said number for a selected processing element (r).

5. The method of claim 1 wherein said truncating is responsive to said value for $E_r$ such that said total number of tasks for said parallel processing system equals the sum of said local mean number of tasks for each processing element ($PE_r$) in said parallel processing system.

6. The method of claim 1 wherein said local mean number of tasks for each processing element ($PE_r$) within said parallel processing system is equal to one either X or (X+1) where X is equal to the local mean.

7. The method of claim 1 wherein said method is performed on a line of said processing elements within said parallel processing system.

8. The method of claim 1 wherein said method is performed on a loop of said processing elements within said parallel processing system.

9. The method of claim 1 wherein said method is performed on an array of said processing elements within said parallel processing system.

10. The method of claim 1 wherein said method is performed on an array of two or more interconnected processing elements within said parallel processing system.

11. A computer readable memory device storing a set of instructions which, when executed, perform a method for calculating a local mean number of tasks for each processing element ($PE_r$) in a parallel processing system, wherein each processing element ($PE_r$) has a local number of tasks associated therewith and wherein r represents the number for a selected processing element, said method performed on at least a portion of the parallel processing elements within the processing system, said method comprising:

assigning a value ($E_r$) to said each processing element ($PE_r$);

summing a total number of tasks present on said parallel processing system and said value ($E_r$) for said each processing element ($PE_r$);

dividing the sum of said total number of tasks present on said parallel processing system and said value ($E_r$) for said each processing element ($PE_r$) by a total number of processing elements in said parallel processing system; and truncating any fractional portion resulting from said dividing for said each processing element to produce said local mean.

* * * * *